United States Patent [19]

Kalsi

[11] Patent Number: 5,473,993
[45] Date of Patent: Dec. 12, 1995

[54] METHOD AND SYSTEM FOR GENERATING POWER ON A MAGNETICALLY LEVITATED VEHICLE

[75] Inventor: Swarn S. Kalsi, Fort Salonga, N.Y.

[73] Assignee: Grumman Aerospace Corporation, Bethpage, N.Y.

[21] Appl. No.: 307,357

[22] Filed: Sep. 14, 1994

[51] Int. Cl.$^6$ .................................................. H02K 41/00
[52] U.S. Cl. ........................... 104/292; 310/12; 318/135
[58] Field of Search ................................... 104/281, 282, 104/286, 290, 292, 294; 310/12, 13; 318/135, 687

[56] References Cited

U.S. PATENT DOCUMENTS

| | | |
|---|---|---|
| 3,820,471 | 6/1974 | Maki et al. . |
| 3,890,906 | 6/1975 | Maki . |
| 3,914,669 | 10/1975 | Holtz ........................................ 104/292 |
| 3,914,670 | 10/1975 | Holtz ........................................ 104/292 |
| 4,198,910 | 4/1980 | Gottzein et al. . |
| 4,273,054 | 6/1981 | Yamaskita et al. . |
| 4,276,832 | 7/1981 | Sika et al. . |
| 4,299,173 | 11/1981 | Arima et al. . |
| 4,303,870 | 12/1981 | Nakumara et al. ........................ 104/292 |
| 4,348,618 | 9/1982 | Nakamura et al. ........................ 104/292 |
| 4,454,457 | 6/1984 | Nakamura et al. ........................ 104/292 |
| 4,779,538 | 10/1988 | Fujiwara et al. ......................... 104/292 |
| 5,213,046 | 5/1993 | Proise . |

*Primary Examiner*—Mark T. Le
*Attorney, Agent, or Firm*—Scully, Scott, Murphy & Presser

[57] ABSTRACT

A method and system of generating power on a magnetically levitated vehicle. The vehicle includes a set of magnets and is supported for movement along a guideway having a multitude of traction conductors. An alternating current is conducted through these conductors to generate a moving electromagnetic field to propel the vehicle along the guideway. The method includes the step of locating a plurality of electrically conductive power generation coils on the vehicle magnet, adjacent the guideway, so that harmonic components of the electromagnetic field generate a first electromagnetic force on the power generation coils. The method also includes: the step of conducting a single phase current through the traction conductors to generate a second electromagnetic force on the power generation coils. These first and second electromagnetic forces produce a current in the power generation coils that may be used to supply power on the vehicle. The first of these electromagnetic forces is dependent on the speed of the vehicle along the guideway. Thus, preferably, the magnitude of the second of these electromagnetic forces is varied to insure that adequate power is available on the vehicle at all speeds.

16 Claims, 8 Drawing Sheets

METHOD AND SYSTEM FOR GENERATING POWER ON A MAGNETICALLY LEVITATED VEHICLE

BACKGROUND OF THE INVENTION

This invention generally relates to magnetically levitated vehicles, and more specifically, to generating power on such vehicles.

In a magnetically levitated vehicle, a group of magnets located on the vehicle are used to hold the vehicle in a levitated or suspended position and to propel the vehicle along a guideway. More specifically, a series of coils, referred to as traction coils or rail coils, are installed along the length of the guideway, and an alternating current, typically a three phase alternating current, is conducted through those coils. This current generates an electromagnetic field that moves along the guideway, and this field interacts with the magnetic field of the magnets on the vehicle to propel the vehicle along the guideway.

The magnets on the levitated vehicle are electromagnets which generate the primary magnetic fields. Recently, attention has been directed toward using superconducting wire for the vehicle electromagnets which produce the primary magnetic field for vehicle levitation and propulsion.

Power, of course, is needed on a magnetically levitated vehicle. For instance, if the vehicle employs an electromagnetic to generate the primary magnetic field, power is needed to produce the current that is conducted through the electromagnetic. In case the electromagnetic is a superconducting electromagnet, power is also needed to operate the refrigeration equipment associated with the superconducting materials. In addition, power is needed to supply other loads on the vehicle, such as heating, air conditioning, and lighting systems.

A typical 100 passenger magnetically levitated vehicle requires, for example, 150 kilowatts of power under all operating conditions. Storage batteries may be used to provide the power needed by a magnetically levitated vehicle; however, storage batteries add additional weight to the vehicle and, thus, increase the amount of power needed to levitate the vehicle.

SUMMARY OF THE INVENTION

An object of this invention is to improve magnetically levitated vehicles.

Another object of the present invention is to improve methods and systems for generating power on magnetically levitated vehicles.

A further object of this invention is to locate a set of electric coils on magnets on a magnetically levitated vehicle, and to transfer power to these coils sufficient to operate the vehicle.

Another object of the present invention is to use a first, speed dependent electromagnetic force to generate electric power to operate a magnetically levitated vehicle, and to use a second, speed independent electromagnetic field to supplement that first electromagnetic force and to insure that sufficient power is generated to operate the vehicle at stand still and at all vehicle speeds.

These and other objects are attained with a method and system of generating power on a magnetically levitated vehicle. The vehicle includes a set of magnets and is magnetically supported for movement along a guideway having a multitude of traction conductors mounted in an iron rail. An alternating current is conducted through those conductors to generate a moving electromagnetic field to propel the vehicle along the guideway. The method includes the step of locating a plurality of electrically conductive power generation coils on the vehicle magnets, adjacent the guideway, so that the slot harmonic components of the electromagnetic field generate a first electromagnetic force, proportional to the vehicle speed, on the power generation coils. The method also includes the step of conducting a single phase current through the traction conductors to generate a second electromagnetic force independent of vehicle speed, on the power generation coils. These first and second electromagnetic forces produce a power in the power generation coils that may be used to supply power on the vehicles. The first of these electromagnetic forces is dependent on the speed of the vehicle along the guideway. Thus, preferably, the magnitude of the second of these electromagnetic forces is varied to insure that adequate power is available on the vehicle at all speeds.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
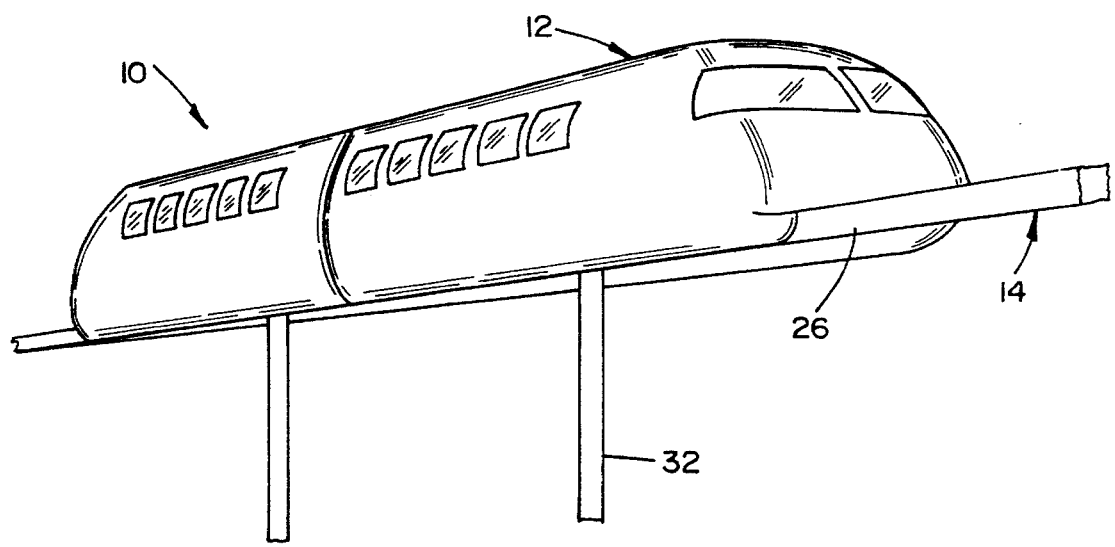
FIGS. 1 and 2 generally illustrate a magnetic levitation system.
Figure 2:
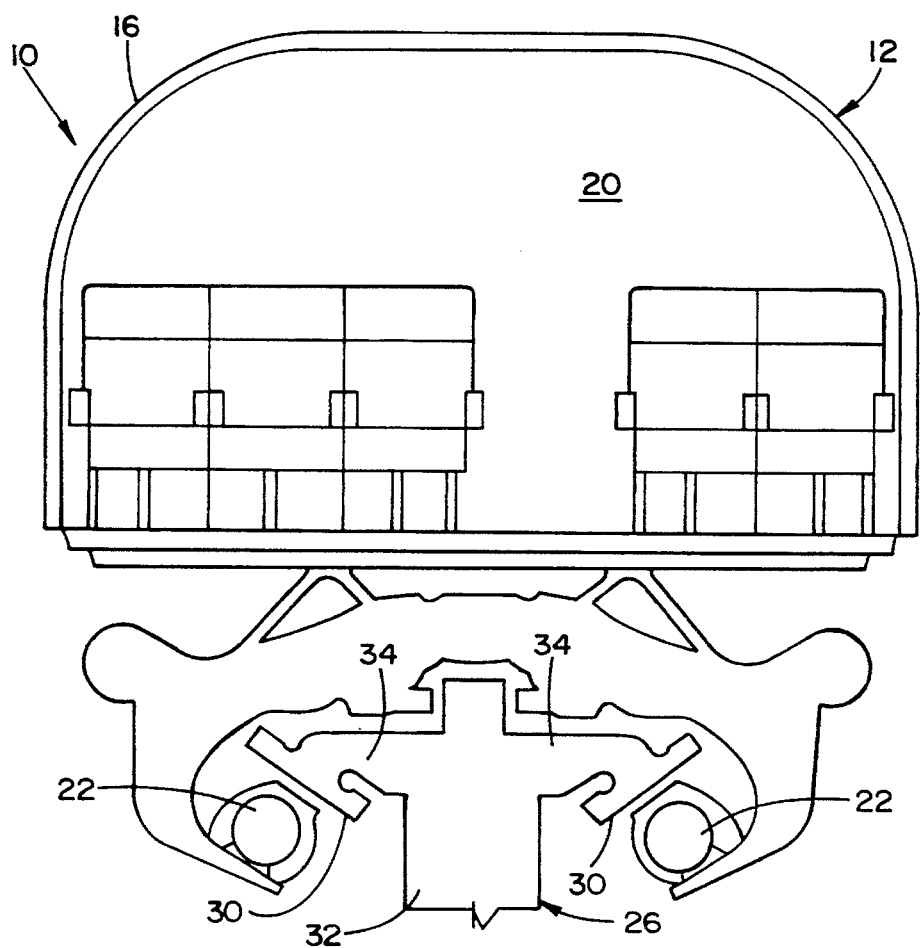

FIGS. 1 and 2 illustrate a magnetic levitation system 10 including magnetically levitated vehicle 12 and guideway 14. Generally, vehicle 12 includes a body 16 that forms a passenger compartment 20, and a plurality of magnets 22 that are secured on or in the body. Guideway 14 extends along a defined path and is used to support and guide movement of vehicle 12 along that path.

Magnetically levitated vehicles are well known, and is not necessary to describe their specific construction and operation herein in detail. Generally, though, each of the magnets 22 on vehicle 12 is an electromagnet secured in or on the vehicle. An electric coil (not shown), preferably a superconducting coil, is mounted on each magnet, and dc electric currents are conducted through that electric coil so that the electromagnet becomes a magnetic dipole.

Figure 3:
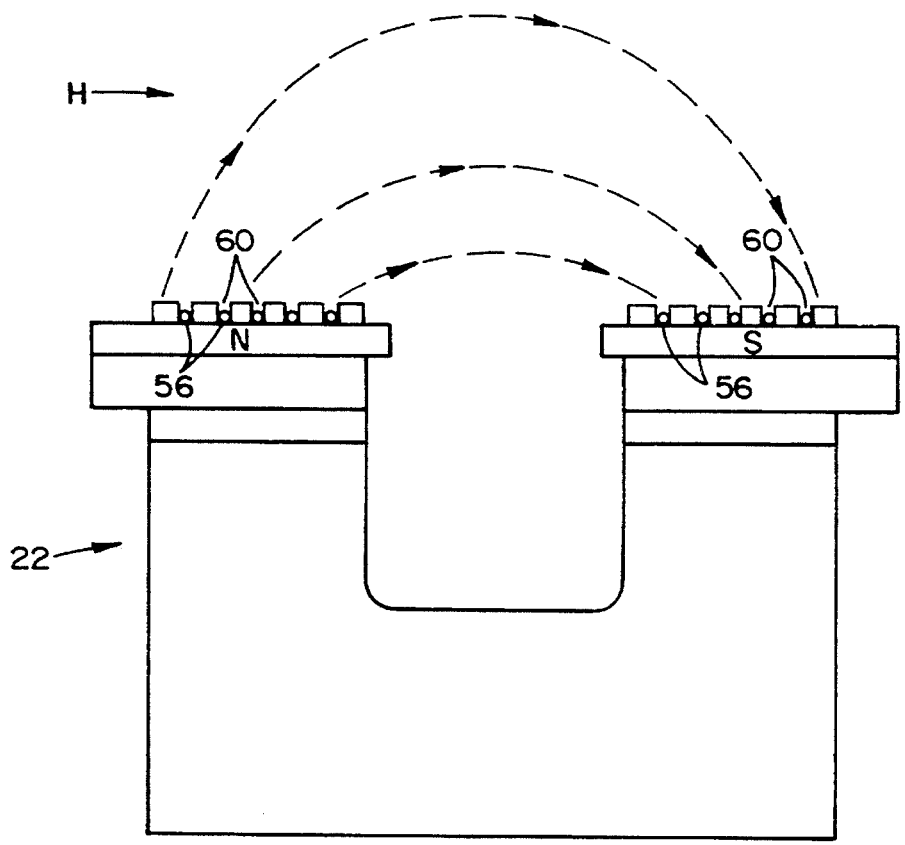
FIG. 3 shows one of the magnets of a vehicle of the system of FIG. 1.

With reference to FIG. 3, each magnetic dipole has a north pole N, a south pole S, and a magnetic dipole moment, and the magnetic dipole moment of each electromagnet produces a magnetic field H that propagates outward from the electromagnet. At any point in space outside of the electromagnet, the direction of force of field H is always perpendicular to the direction of propagation of the field at that point. The dashed lines shown in FIG. 3 represent lines of magnetic force, or magnetic flux lines, and the direction of force of field H along these lines is shown by the arrows on those dashed lines.

Guideways for magnetically levitated vehicles are also well known in the art, and it is unnecessary to describe their specific construction herein in detail. Generally, guideway 14 includes a frame 26 that may be made from metal, concrete, or metal reinforced concrete, and one or more electrical conductors 30 that are embedded in an iron rail 31 which extends along the guideway 14. These conductors 30, which are often referred to as traction windings or rail windings, may be aluminum coils or copper coils embedded in the iron rail 31 mounted to the guideway 14. The guideway shown in FIGS. 1 and 2 has a T-shape, including a vertical support column 32 and laterally extending arms 34, and conductors 30 are secured to or in arms 34. Guideway 14 may have a substantial length and may be considered as being comprised of a multitude of sections arranged in sequence along the guideway. Preferably, each section of guideway 14 has one or more rail windings 30, and the rail windings in each section of the guideway may be connected to an electric current source independent of the rail windings in the other guideway sections.

Figure 4:
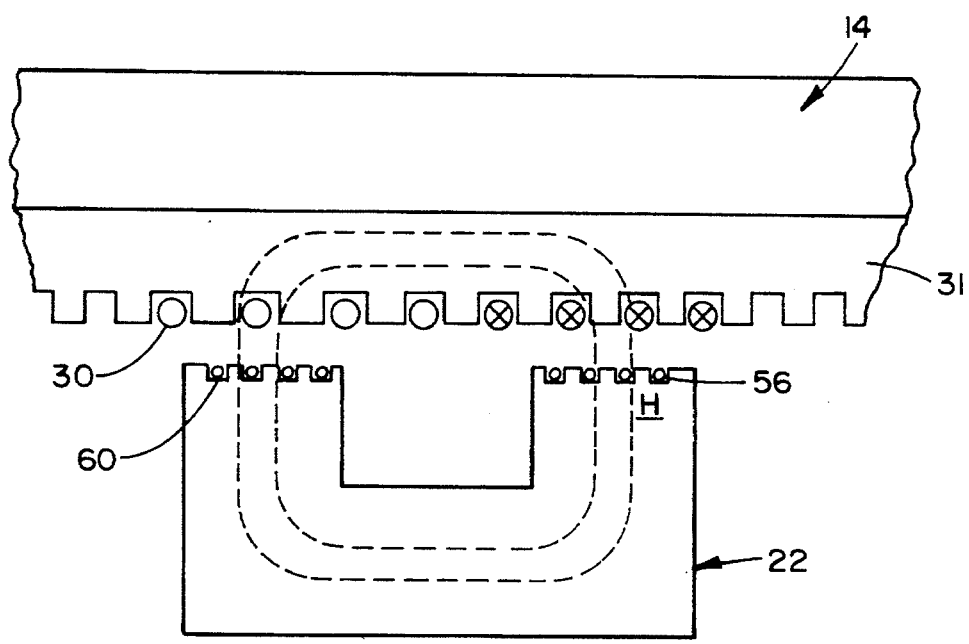
FIG. 4 shows a magnet and an adjacent portion of a guideway rail for the vehicle.

In the operation of system 10, a current, which preferably is a three-phase variable frequency alternating current, is conducted through conductors 30 of guideway 14. With reference to FIG. 4, these currents generate a propulsion force by interacting with the magnetic field H produced by electromagnets 22 on vehicle 12. The traction winding 30 currents and field H are controlled to remain in synchronism as the vehicle 12 moves along guideway 14 at any speed.

Figure 5:
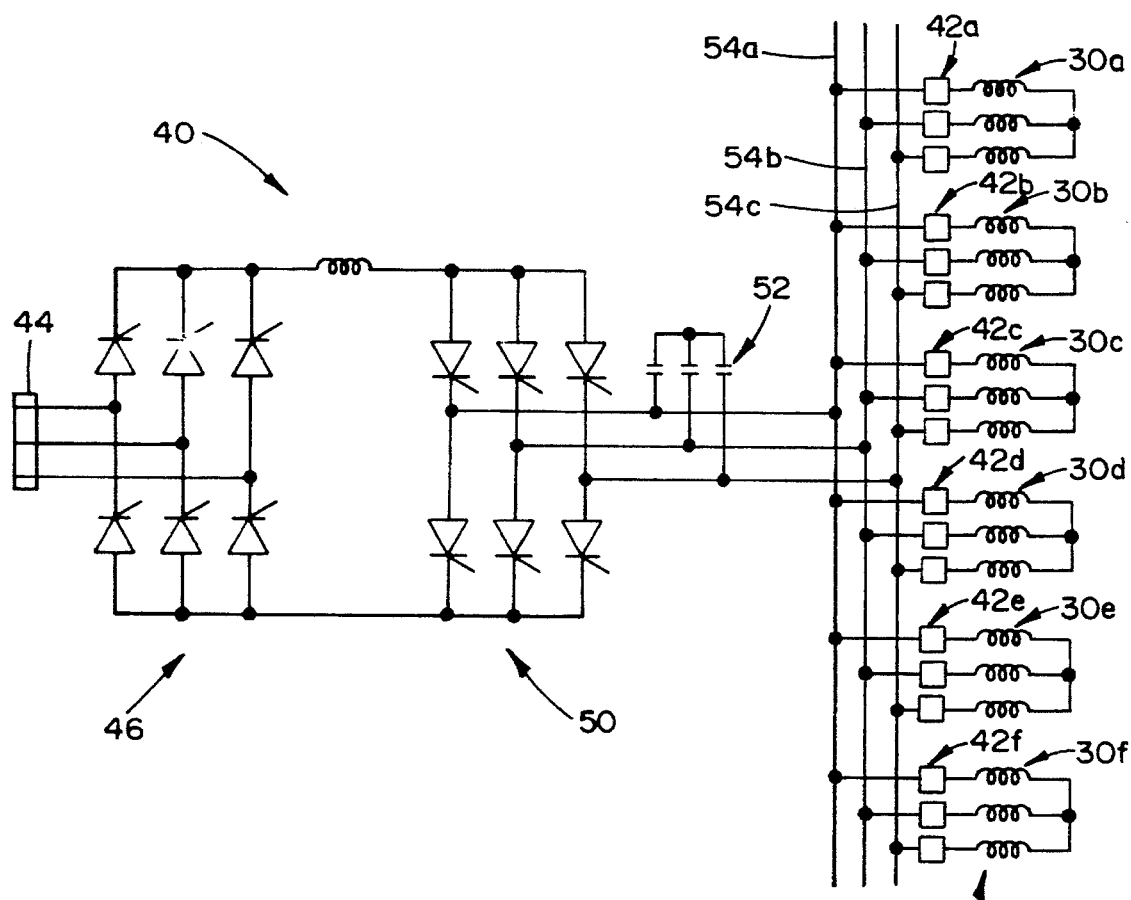
FIG. 5 is a schematic drawing of a power supply circuit to supply propulsion coils in the rail for propelling the vehicle of FIG. 1 along a guideway.

FIG. 5 illustrates a conventional electrical circuit 40 for supplying power to traction windings 30. FIG. 5 shows six blocks of traction windings, referenced at 30a–30f, and each of these windings blocks is connected to power circuit 40 by a respective one set of switches, referenced at 42a–42f. In circuit 40, ac power is drawn from a power grid, schematically represented at 44, and converted to direct current in rectifier section 46. Invertor section 50 converts this power back to alternating current, at a controlled, variable frequency, that is then supplied to the traction windings at the desired frequency. Capacitors 52 are connected at the output of invertor section 50 to prevent the voltage therein from exceeding preferred levels.

As illustrated in FIG. 5, traction windings 30a–30f preferably are three phase windings, and these windings are thus provided with a three phase alternating current at a controlled, adjustable frequency. The current is supplied to windings 30a–30f via feed lines 54a, 54b, and 54c and switches 42a–42f that may be, for example, bilateral thyristor switches. These switches 42a–42f are closed and opened in an ordered sequence to change the specific guideway section to which the power current is conducted. For example, current may be conducted to the guideway sections one section at a time and in the order in which those sections are located along the guideway.

As previously mentioned, power is required on vehicle 12. For example, power is needed to produce the currents that are conducted through magnets 22 to generate magnetic fields H. If magnets 22 are superconducting magnets, electrical power is also needed to operate the refrigeration apparatus associated with those magnets. In addition, power is needed to operate any heating, air conditioning and lighting equipment on vehicle 12, as well as other electrical systems in the vehicle. In accordance with the present invention, a unique approach is employed for generating power on vehicle 12.

The approach is based, in part, on exciting the traction windings of the linear synchronous motor with a single phase current, preferably having a high frequency such as 600 Hz. The power generated by means of this single phase current is independent of the speed of vehicle 12, but the single phase current produces additional $I^2R$ loss in the traction windings. It is also possible to generate most of the required power at full speed with airgap flux variations, referred to as slot harmonics, associated with permeance changes due to the rail slots.

By combining two power generation approaches, it is possible to reduce significantly the high frequency traction winding current and $I^2R$ loss at higher speeds. But at lower speeds, most of the power may be generated by the high frequency excitation of the traction windings. The chief advantage of this power generation approach is the elimination of a need to carry substantial amount of storage batteries on vehicle 12. The specific approach described herein in detail is particularly well suited for use with an electromagnetic suspension system; however, as will be understood by those of ordinary skill in the art, the present invention may be used with other types of suspension systems such as electrodynamic suspension systems.

Figure 6:
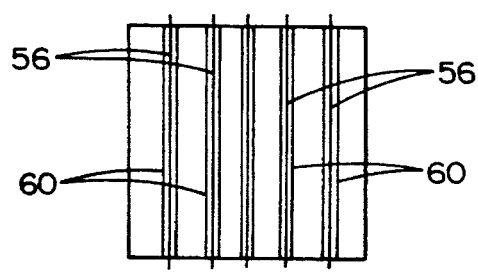
FIG. 6 is a top view of a pole face of the magnet of FIG. 3.

With reference to FIGS. 3, 4, and 6, in accordance with the present invention, magnet 22 is provided with a plurality of power generation electric coils 56 that, in system 10, are located adjacent traction windings 30. As magnet 22 moves along guideway 14, the electromagnetic field generated by traction windings 30 applies an electromagnetic force on coils 56 and induces an electric current in these coils. Also, an additional, single phase alternating current, which preferably is a high frequency alternating current, is supplied to traction windings 30 via power circuit 40, and this additional alternating current generates a further electromagnetic force that acts on coils 56 to induce current therein.

The magnitude of the first of the above-mentioned electromagnetic forces—and thus the magnitude of the current induced in coils 56 by this force—depends on the speed of vehicle 12 along guideway 14. The magnitude of that current is zero when vehicle 12 is at rest relative to guideway 14, and increases as the speed of the vehicle increases. The magnitude of the second of the above-mentioned electromagnetic forces—and hence the magnitude of current induced in coils 56 by this force—is independent of the speed of vehicle 12 along guideway 14, and instead depends on the magnitude of the additional, single phase ac power supplied to traction coils 30. The magnitude of this second electromagnetic force may be controlled to compensate for changes in the magnitude of the first electromagnetic force, so that the current induced in coils 56 is sufficient to satisfy the power needs on vehicle 12 at all speeds.

More specifically, with the preferred embodiment of vehicle 12 illustrated in the drawings, in which each magnet 22 has a U-shape core with two poles adjacent guideway 14, each magnet pole has a plurality of slots 60 and coils 56 are positioned and held in those grooves. Any suitable means may be used to hold coils 56 in slots 60, and for example, wedges may be employed in slots 60 to hold the coils in place.

As mentioned above, the fundamental components of the electromagnetic field generated by the power current in traction coils 30 moves along guideway 14 at the same speed as vehicle 12, and hence this electromagnetic field does not move relative to coils 56. However, harmonics of this field do not move in synchronism with the vehicle. These harmonics induce currents in power pick up coils. The dominant harmonic component is due to slot harmonics.

Figure 7:
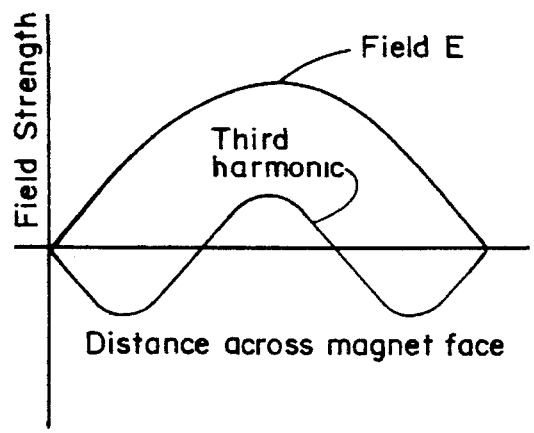
FIG. 7 illustrates the magnitude of the electromagnetic force on the pole face of the magnet, and fundamental and third harmonic components of that force.

For instance, FIG. 7 shows the fundamental field component E across magnet 22 and the third harmonic of that field wave. Except at certain node points, the strength of each harmonic at any given point changes over time, resulting in an electromagnetic field that changes relative to electric coils 56. This moving field induces a current in coils 56, and the magnitude of this current is given by equation (1):

$$V_s = 2B_n l v \cos\{(n\pi/\tau)(vt+a/2)\} \sin\{(n\pi/\tau)(a/2)\} \qquad (1)$$

where $B_n$=Peak field component of the $n^{th}$ harmonic (as measured in tesla), $\tau$=Pole pitch (meters), n=Harmonic number, v=Linear velocity of vehicle 12 (meters/second), a=Coil bore width (meters), l=Coil length-perpendicular to the plane of the magnet pole face (meters), and t=Time (seconds).

Figure 8:
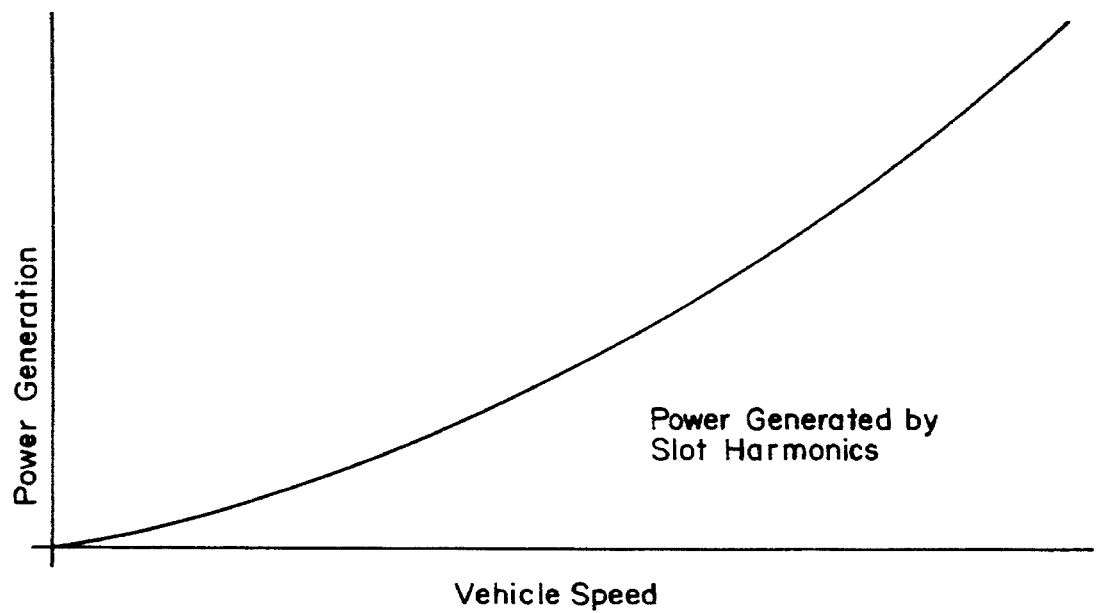
FIG. 8 shows the power generated on a coil on the magnet pole face by one type of electromagnetic force.

This process by which current is induced in coils 56 may be referred to as slot harmonics; and, as is apparent from equation (1), $V_s$ is a function of several variables, including the speed of the vehicle along the guideway. For constant $\tau$, n, a, l, and t variables, FIG. 8 shows the power generated by slot harmonics as a function of the vehicle speed; and as shown in this Figure, at low vehicle velocities, the amount of power generated by slot harmonics is comparatively low and in fact drops to zero at zero vehicle speed.

In order to provide power on vehicle 12 at low vehicle speeds, an additional, single phase alternating current is applied to the traction windings 30, preferably via power circuit 40. This single phase alternating current generates a magnetic field that moves relative to coils 56, also inducing electric current therein. Preferably, the frequency of the single phase ac source is comparatively high, such as 400–600 Hz, in order to minimize the effect of that ac power on the levitation and propulsion forces developed in system 10. This additional alternating current may be supplied in a variety of different ways. For instance, as illustrated in FIG. 9, this single phase ac power may be supplied from source 62 to each of lines 64, 66, and 70 through a respective one transformer 72a, 72b and 72c.

Figure 10:
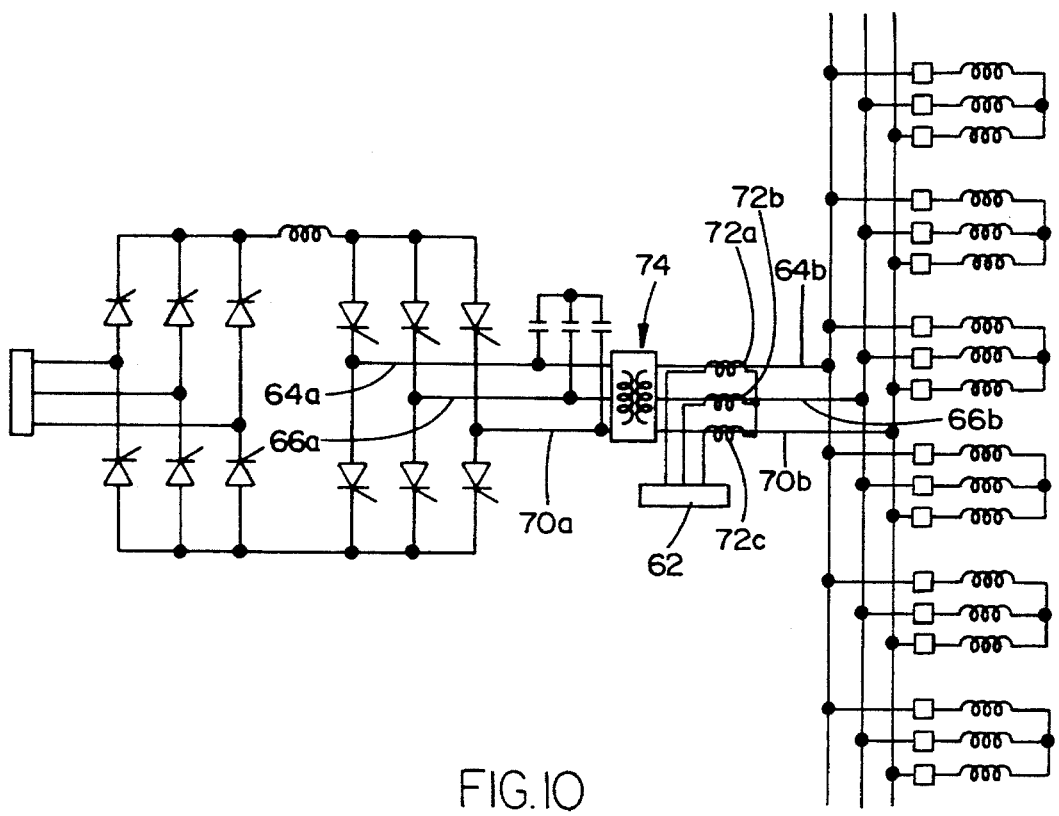
FIGS. 10–13 show alternate ways for connecting the supplemental power supply to the power circuit of FIG. 5.

As shown in FIG. 10, an isolation transformer 74 may be used to isolate transformers 72a, 72b, and 72c from other elements of circuit 40. In particular, as shown in FIG. 10, lines 64, 66, and 70 are separated into sections 64a, 64b, 66a, 66b, and 70a, 70b. Transformer 74 is employed to generate the desired three phase ac power in lines 64b, 66b, and 70b from the three phase ac power in lines 64a, 66a, and 70a, and transformers 72a, 72b, and 72c may be used to supply the single phase ac power to each of the lines 64b, 66b, and 70b respectively.

Figure 11:
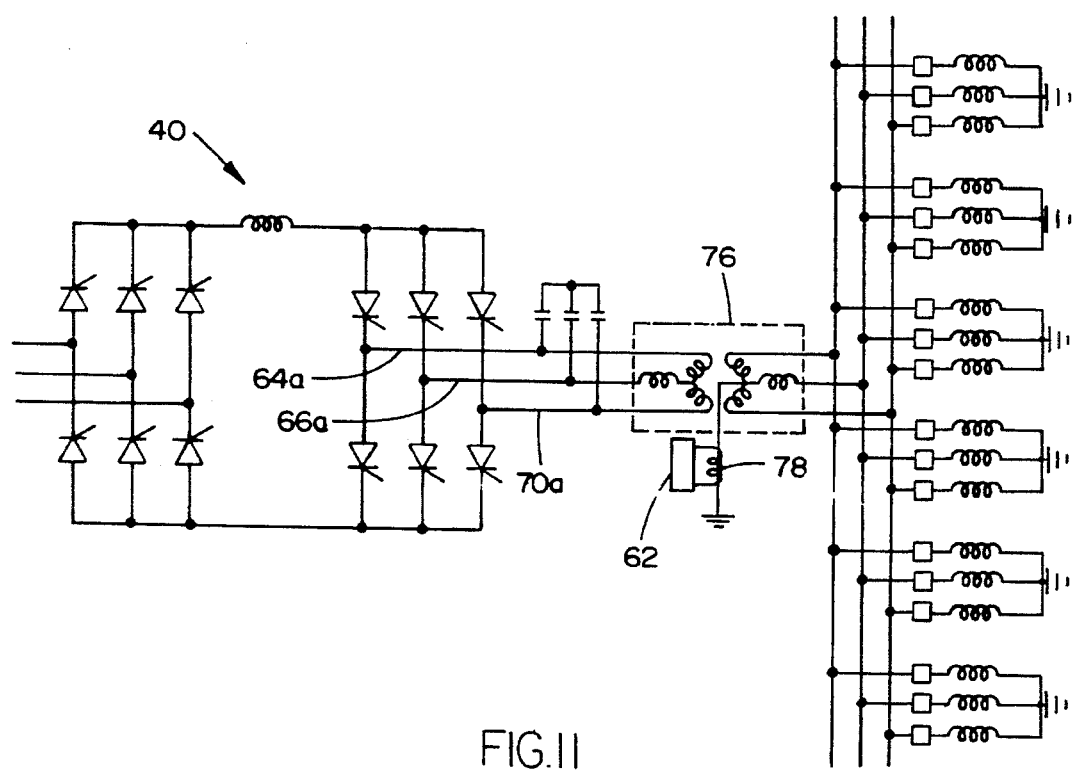
Figure 12:
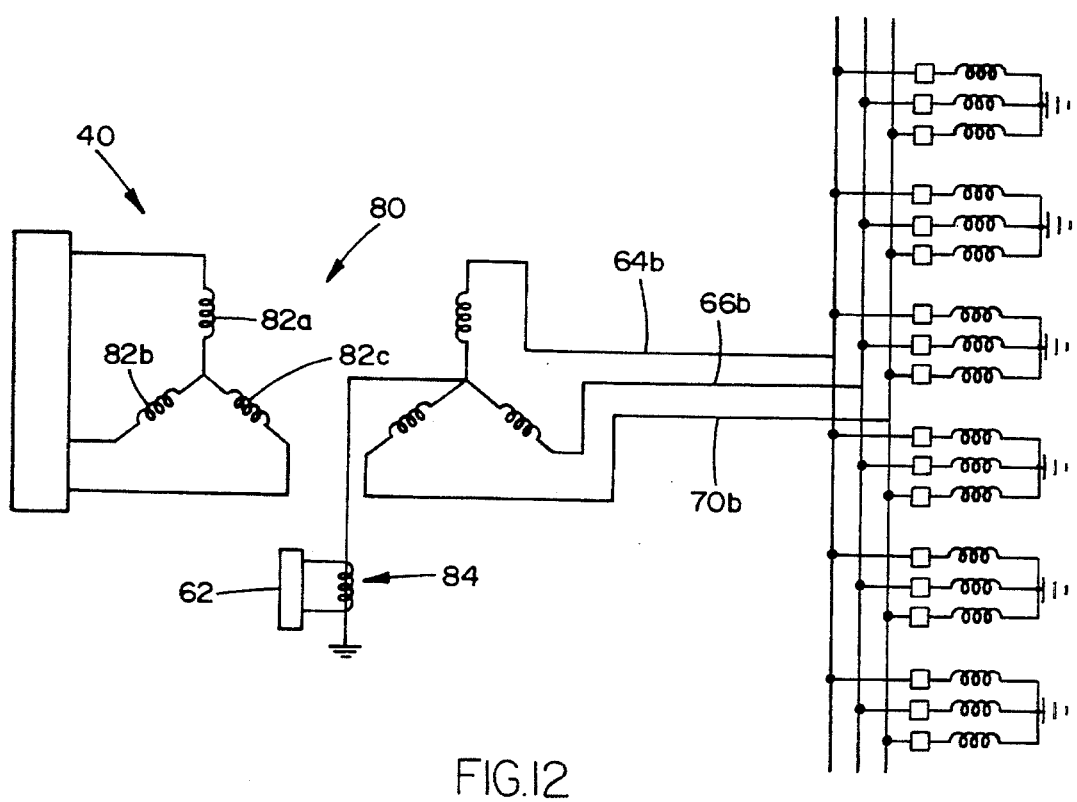

As illustrated in FIG. 11, an isolation transformer 76 may be used to induce a three phase ac power in lines 64b, 66b, and 70b from the three phase ac power in lines 64a, 66a, and 70a, and transformer 78 may be used to supply the single phase ac power to the neutral line of the secondary of the transformer 76. FIG. 12 illustrates a circuit in which invertor section 50 has been eliminated. In this circuit, a step down transformer 80 is used to induce a three phase ac power in lines 64b, 66b, 70b from a three phase input current conducted through windings, 82a, 82b, and 82c and the additional single phase ac power is supplied through the neutral line of the secondary of transformer 80 via transformer 84. In the circuits shown in FIGS. 10–12, transformers 74, 76, and 80 become inefficient at low frequencies.

Figure 9:
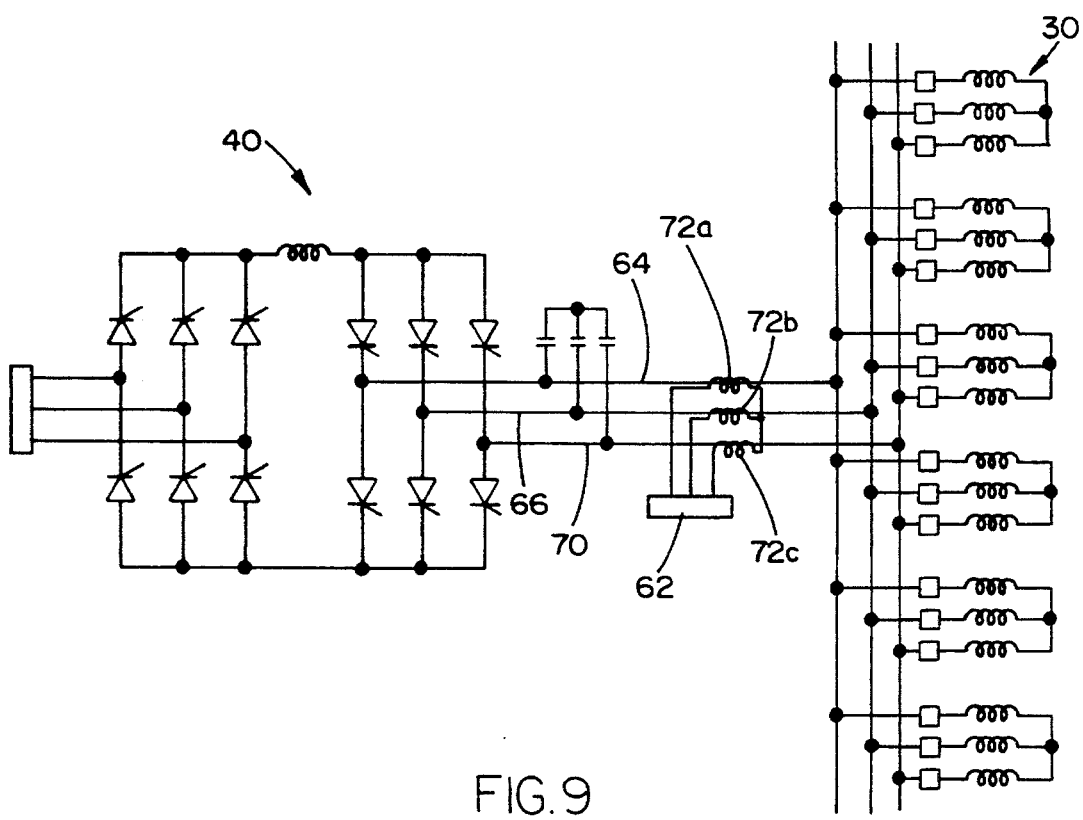
FIG. 9 illustrates how a supplemental power supply may be connected to the power circuit of FIG. 5.
Figure 13:
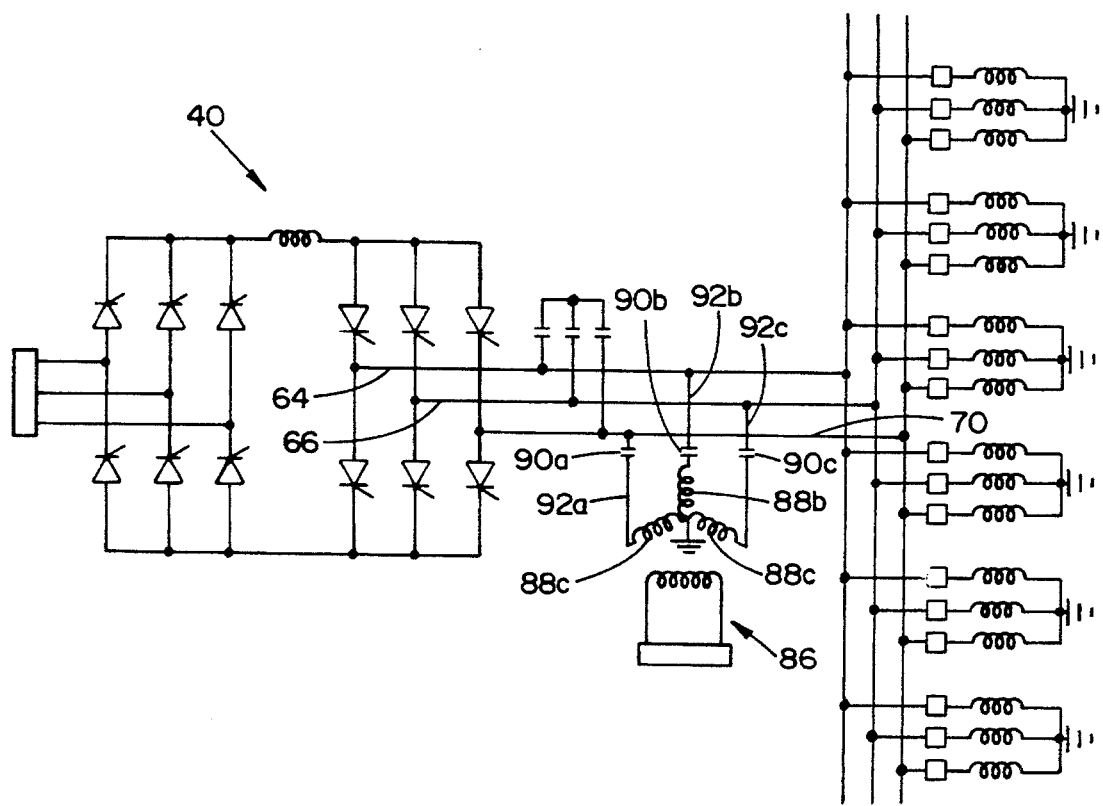

FIG. 13 shows a configuration that may be advantageous when the frequency of the three phase ac power is very low, or in case, for example, the high frequency circuit of FIG. 9 interacts unfavorably with the invertor section 50 of circuit 40. In the system of FIG. 13, transformer 86 is used to induce currents in each of three windings 88a, 88b, and 88c that are connected to lines 64, 66, and 70 respectively. Capacitors 90a, 90b, and 90c are located in the single phase ac power supply, and specifically in lines 92a, 92b, and 92c, to block the flow of low frequency currents from lines 64, 66, and 70 and through transformer 86.

Figure 14:
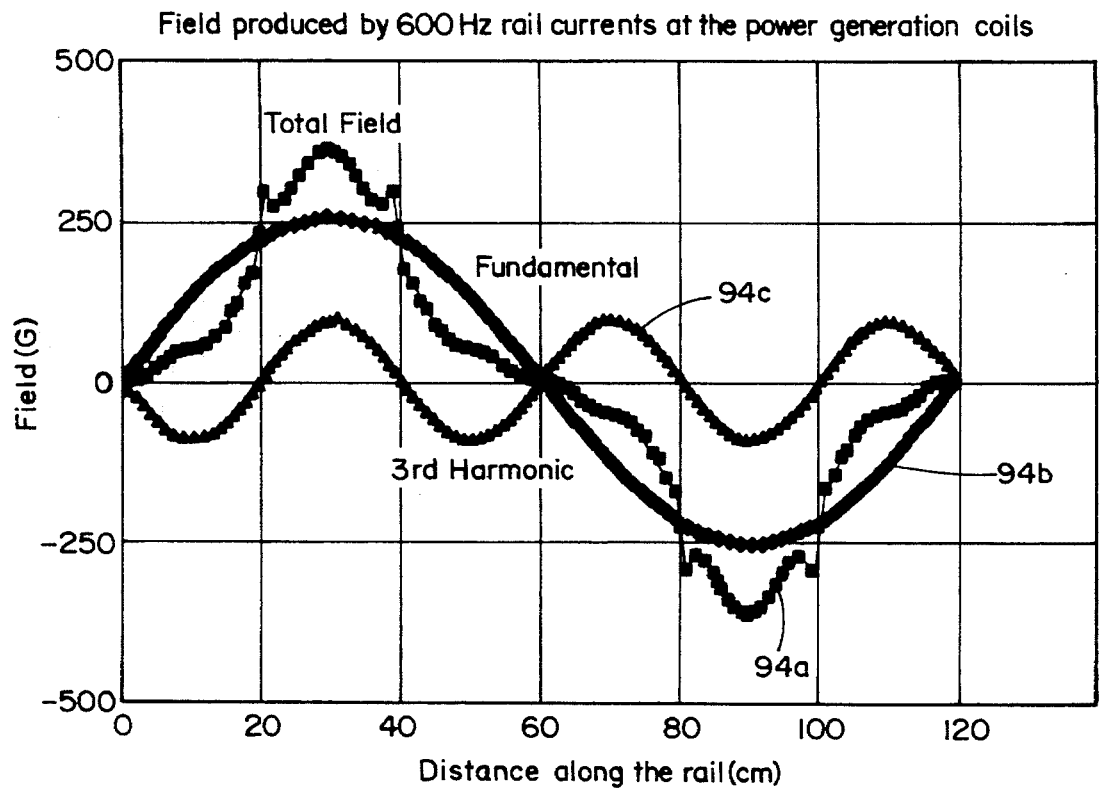
FIG. 14 illustrates an electromagnetic field, and fundamental and third harmonic components, produced by the supplemental power circuit.

As an example, a 500 amp, single phase current supplied to all three traction windings of a guideway section generates a space harmonic wave form of the type shown at 94a in FIG. 14. This wave form is comprised of a multitude of component wave forms, referred to as harmonic wave forms or as harmonics, two of which are also shown at 94b and 94c in FIG. 14. Each of these harmonics has a different number of, and is identified by that number of, complete wavelengths along the length of the total field wave. For example, the first, or fundamental, harmonic waveform has one wavelength, the third harmonic wave form has three wavelengths, and the fifth harmonic wave form has five wavelengths.

The harmonic components of the total field wave shown in FIG. 14 are summarized in Table 1.

TABLE 1

| Harmonic Number | Peak Field Strength (Gauss) |
|---|---|
| 1 | 255 |
| 3 | −90 |
| 5 | 17 |
| 7 | 11 |
| 9 | −8 |
| 11 | −11 |
| 13 | 8 |
| 15 | −8 |
| 17 | −½ |
| 19 | 7 |

As this table shows, the fundamental and the third harmonics are the dominant components of the total field wave, and these two harmonic wave forms are shown in FIG. 14. Since these harmonic wave forms, as well as the other harmonic wave forms of the total field wave, are generated by a single phase current in rail windings 30, these wave forms are static with respect to guideway 12 but pulsate at the supply frequency.

The voltage induced in each power generating coil 56 by this single phase ac power is given by equation (2):

$$V_f = (dB_n/dt) l (2\pi/(n\pi)) \sin\{(n\pi/\tau)(vt+a/2)\} \sin\{(n\pi/\tau)(a/2)\} \qquad (2)$$

where $B_n$=Peak field component of $n^{th}$ harmonic from Table 1, $\tau$=pole pitch (meters), n=harmonic number, a=coil bore width (meters), l=coil length in direction perpendicular to magnet pole face, and t=time.

As will be appreciated by those of ordinary skill in the art, the single phase current in traction windings 30 creates an additional $I^2R$ loss in the traction windings. To eliminate or to minimize this loss, the power generated by this single phase current is preferably only used to complement the power generated by the slot harmonics, when vehicle 12 is travelling along guideway 14 at less than a specified value.

At lower vehicle speeds, the magnetic force—and thus the traction winding current—required to propel vehicle 12 along guideway 14 is less than at higher vehicle speeds. Because of this, at lower vehicle speeds, the magnitude of the single phase ac power can be increased without imposing a significant additional heat load on the traction windings.

For example, as the vehicle speed decreases—and thus the power generated by the slot harmonics also decreases—the magnitude of the single phase ac power can be increased so that the power generated by that ac power also increases. As a more specific example, the power generated by the ac power can be increased so that the sum of the power generated by the slot harmonics and the power generated by the ac power remains at or above a preset level.

As an example, at a speed of 300 mph, the slot harmonics induces five volts in each power generation coil 56. At this voltage, 200 turns are needed in each coil 56 to produce 1000 watts of power. The traction windings 30 must carry 500 amps of the supplementary alternating current power in order to induce five volts in each power generation coil 56. By mixing the contributions of the supplementary power and the slot harmonics, the required power may be generated by coils 56 at all vehicle speeds.

Figure 15:
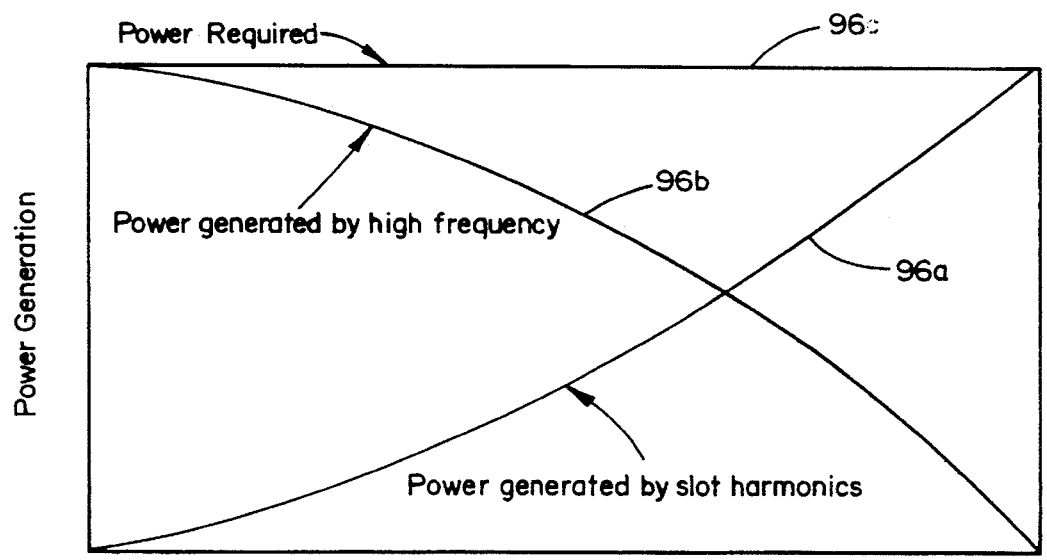
FIG. 15 shows one way to combine two power generation schemes.

FIG. 15 shows, for example, a plausible combination of the two power generation scheme. In this Figure, the power generated by the supplemental ac power is shown by curve 96a, the power generated by slot harmonics is shown by curve 96b, and the total power generated by these two sources is shown by line 96c. In this approach, when vehicle 12 is standing, all of the power is generated via the supplemental alternating current power; and as the vehicle speed increases, the power generated by the slot harmonics increases, while the power generated by the supplemental ac power decreases. When the vehicle reaches a relatively high speed, referred to as full speed, all of the power is generated via the slot harmonics. In this way, the traction winding $I^2R$ losses can be minimized or at least lessened.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of generating power on a magnetically levitated vehicle having a magnet and that is moved along a guideway having a multitude of traction conductors, and in which an alternating current is conducted through the traction conductors to generate a moving magnetic field to propel the vehicle along the guideway, said moving magnetic field being comprised of a series of harmonic field waves, the method comprising:

locating a plurality of electrically conductive power generation coils on the magnet, adjacent the guideway, wherein said harmonic waves generate a first electromagnetic force on the power generation coils;

conducting a single phase current through the traction conductors to generate a second electromagnetic force on the power generation coils; and said first and second electromagnetic forces producing a current in the power generation coils.

2. A method according to claim 1, wherein the magnet includes a pole located closely adjacent the guideway, and the step of locating the power generation coils in the magnet includes the steps of:

forming a plurality of slots in the poles of the magnet; and locating the power generation coils in said slots.

3. A method according to claim 1, wherein the single phase current has a magnitude and the conducting step includes the step of adjusting said magnitude to vary the magnitude of the second electromagnetic force on the power generation coils.

4. A method according to claim 3, wherein the current produced in the power generation coils has a magnitude, and the step of adjusting the magnitude of the single phase current includes the step of adjusting the magnitude of the single phase current to maintain the magnitude of the current produced in the power generation coils above a predetermined level.

5. A method according to claim 1, wherein the alternating current is supplied to the traction conductors by a primary power circuit, and the conducting step includes the step of transmitting the single phase current to the traction conductors through the primary power circuit.

6. A method according to claim 5, wherein the transmitting step includes the steps of:

conducting the single phase current from a source thereof to a transformer; and using the transformer to induce the single phase current in the power circuit.

7. A method according to claim 5, wherein the primary power circuit includes an output line for conducting the alternating current to the traction conductors, and the conducting step includes the steps of:

separating the output line into first and second sections;

using an isolation transformer to transmit current from said first section to said second section; and transmitting the single phase current to the second section of the output line.

8. A method according to claim 5, wherein the conducting step includes the steps of:

transmitting the single phase current to the primary power circuit via an auxiliary circuit; and locating a capacitor in the auxiliary circuit to inhibit the transmission of low frequency current through the auxiliary circuit from the primary power circuit.

9. A method according to claim 1, wherein the single phase current has a frequency above 200 Hz.

10. A method according to claim 9, wherein the frequency of the single phase current is between approximately 400 Hz and 600 Hz.

11. A system for generating power on a magnetically levitated vehicle which is moved along a guideway, comprising:

a guideway including traction windings;

a primary power circuit to conduct a first alternating current to the traction windings to generate a moving electromagnetic field, said moving electromagnetic field including a series of harmonic component electromagnetic fields;

a magnet secured on the magnetically levitated vehicle and generating a magnetic field, said electromagnetic field and said magnetic field interacting to levitate the vehicle and to propel the vehicle along the guideway;

a plurality of power generating electric coils secured on the magnet for movement therewith along the guideway, wherein the harmonic component fields of the moving electromagnetic field produces an electromagnetic force on said power generating coils to generate an electric current therein; and an auxiliary power circuit to supply a single phase alternating current to the traction windings to produce another electromagnetic force: on said power generating coils.

12. A system according to claim 11, wherein the auxiliary power circuit includes a capacitor to inhibit the transmission of low frequency current from the primary power circuit of the auxiliary power circuit.

13. A system according to claim 11, wherein the single phase alternating current has a magnitude, and the means to supply the single phase alternating current includes means to vary the magnitude of said single phase alternating current.

14. A system according to claim 13, wherein: the magnet includes a pole located closely adjacent the guideway;

the magnet pole forms a plurality of slots, and the power generating electric coils are located in said slots.

15. A system according to claim 11, wherein the auxiliary power circuit includes means to transmit the single phase current from the auxiliary power circuit to the primary power circuit.

16. A system according to claim 11, wherein:

the primary power circuit includes
 i) an output line having first and second sections, and
 ii) an isolation transformer for transmitting the first alternating current from the first section of the output line to the second section of the output line; and the auxiliary power circuit includes means to transmit the single phase current from the auxiliary power circuit to the second section of the output line.

\* \* \* \* \*